US011563623B2

(12) United States Patent
Strater et al.

(10) Patent No.: US 11,563,623 B2
(45) Date of Patent: Jan. 24, 2023

(54) HOME NETWORK HEALTH METRICS REPORTING (71) Applicant: ARRIS Enterprises LLC, Suwanee, GA (US)

(72) Inventors: Jay William Strater, San Diego, CA (US); Paul D. Baker, San Diego, CA (US); Gregory Nobutaka Nakanishi, San Diego, CA (US); Subha Rajasekar, Pleasanton, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/407,551

(22) Filed: Aug. 20, 2021

(65) Prior Publication Data
US 2022/0116266 A1 Apr. 14, 2022

Related U.S. Application Data (60) Provisional application No. 63/090,893, filed on Oct. 13, 2020.

(51) Int. Cl.
H04L 12/00 (2006.01)
H04L 41/0654 (2022.01)
(Continued)

(52) U.S. Cl.
CPC .... *H04L 41/0654* (2013.01); *G06F 16/24578* (2019.01); *G06F 16/285* (2019.01); *H04L 41/14* (2013.01); *G06Q 30/016* (2013.01)

(58) Field of Classification Search
CPC ....... H04L 67/10; H04L 43/067; H04L 43/16; H04L 43/08; H04L 41/14; H04L 41/0654; G06F 16/285; G06F 16/24578
(Continued)

(56) References Cited

U.S. PATENT DOCUMENTS 8,533,842 B1 * 9/2013 Satish ............... H04L 63/20
726/25
8,861,109 B1 * 10/2014 Hwang ............... G11B 5/02
360/31
(Continued)

FOREIGN PATENT DOCUMENTS

EP 3343840 A1 * 7/2018 ............ H04L 43/08
EP 3690883 A1 * 8/2020 .......... G06F 11/1044

OTHER PUBLICATIONS

International Search Report and Written Opinion of the International Searching Authority dated Nov. 25, 2021 in International (PCT) Application No. PCT/US2021/046874.

*Primary Examiner* — Frantz Coby
(74) *Attorney, Agent, or Firm* — Wenderoth, Lind & Ponack, L.L.P.

(57) ABSTRACT

An electronic device for use with a network device, includes: a memory, having stored therein, a first and second set of threshold weighted metric values and a remediation suggestion; and a processor configured to execute instructions stored on the memory to cause the electronic device to: obtain a first of metric values associated with a first set of metrics, respectively, within a first metric category of the network device; provide a first set of weighting factors for the first set of metric values, respectively; determine a first set of weighted metric values associated with the first set of metric values, respectively, and being based on the first set of metric values and the first set of weighting factors; and perform a remediation operation associated with the remediation suggestion when the first metric category score is lower than a first metric category score threshold.

12 Claims, 6 Drawing Sheets (51) Int. Cl.
  *G06F 16/28* (2019.01)
  *G06F 16/2457* (2019.01)
  *H04L 41/14* (2022.01)
  *G06Q 30/00* (2012.01)
(58) Field of Classification Search
  USPC .......................................... 709/224, 225, 226
  See application file for complete search history.

(56) References Cited

U.S. PATENT DOCUMENTS

| | | | |
|---|---|---|---|
| 9,729,464 B1 * | 8/2017 | Mihailovici | G06F 9/5077 |
| 10,033,602 B1 * | 7/2018 | Russell | H04L 43/20 |
| 2007/0014385 A1 * | 1/2007 | Shiraishi | G11B 20/10481 |
| | | | 375/350 |
| 2014/0330955 A1 * | 11/2014 | Bishop | H04L 67/00 |
| | | | 709/224 |
| 2015/0039749 A1 * | 2/2015 | Kwan | H04L 43/067 |
| | | | 709/224 |
| 2016/0066267 A1 * | 3/2016 | Narang | H04W 4/80 |
| | | | 370/311 |
| 2017/0126516 A1 * | 5/2017 | Tiagi | H04L 69/22 |
| 2019/0141543 A1 | 5/2019 | Ganapathi et al. | |
| 2019/0386904 A1 * | 12/2019 | Srivatsan | H04L 41/0813 |
| 2020/0133257 A1 * | 4/2020 | Cella | G05B 19/4185 |
| 2020/0274782 A1 * | 8/2020 | Balaiah | H04L 67/10 |
| 2020/0358702 A1 * | 11/2020 | Agrawal | H04L 49/354 |
| 2021/0124815 A1 * | 4/2021 | Rindal | G06F 21/32 |
| 2022/0116266 A1 * | 4/2022 | Strater | H04L 43/08 |

* cited by examiner

| | | R-SF | Y-SF | G-SF | Min_data | | 15 Mins = 15 Bins Per STA | | | | | | |
| | 510 | 0 | 30 | 100 | 5 | | Assuming 10 STAs = 150 STA Counts When Fully Present | | | | | | |

| Network Metric Category | Measure | Red | Yellow | Green | Total | Red Frac | Yellow Frac | Green Frac | Red Weight | Yellow Weight | Green Weight | Weighted Avg | Calcs |
|---|---|---|---|---|---|---|---|---|---|---|---|---|---|
| C1 | M1 | 4 | 19 | 27 | 50 | 0.08 | 0.38 | 0.54 | 0.00 | 11.40 | 54.00 | 65.40 | |
| | M2 | 5 | 35 | 60 | 100 | 0.05 | 0.35 | 0.60 | 0.00 | 10.50 | 60.00 | 70.50 | C1 Experience Index: 65 |
| | M3 | 2 | 24 | 24 | 50 | 0.04 | 0.48 | 0.48 | 0.00 | 14.40 | 48.00 | 62.40 | C1 Grade: D |
| | M4 | 4 | 49 | 47 | 100 | 0.04 | 0.49 | 0.47 | 0.00 | 14.70 | 47.00 | 61.70 | Main Contributor: M4 |
| 502 | Count | | | | | | | | | | | 4.00 | |
| | Sum | | | | | | | | | | | 260.00 | |
| | Averaged Sum | | | | | | | | | | | 65.00 | |
| | Scaled Sum | | | | | | | | | | | 65.00 | |
| C2 | M5 | 1 | 0 | 14 | 15 | 0.07 | 0.00 | 0.93 | 0.00 | 0.00 | 93.33 | 93.33 | C2 Experience Index: 77 |
| | M6 | 1 | 0 | 14 | 15 | 0.07 | 0.00 | 0.93 | 0.00 | 0.00 | 93.33 | 93.33 | |
| | M7 | 5 | 5 | 5 | 15 | 0.33 | 0.33 | 0.33 | 0.00 | 10.00 | 33.33 | 43.33 | C2 Grade: C |
| | M8 | 0 | 0 | 15 | 15 | 0.00 | 0.00 | 1.00 | 0.00 | 0.00 | 100.00 | 100.00 | |
| | M9 | 7 | 3 | 5 | 15 | 0.47 | 0.20 | 0.33 | 0.00 | 6.00 | 33.33 | 39.33 | Main Contributor: M13 |
| 504 | M10 | 0 | 0 | 15 | 15 | 0.00 | 0.00 | 1.00 | 0.00 | 0.00 | 100.00 | 100.00 | |
| | M11 | 3 | 6 | 6 | 15 | 0.20 | 0.40 | 0.40 | 0.00 | 12.00 | 40.00 | 52.00 | |
| | M12 | 0 | 0 | 15 | 15 | 0.00 | 0.00 | 1.00 | 0.00 | 0.00 | 100.00 | 100.00 | |
| | M13 | 5 | 3 | 2 | 10 | 0.50 | 0.30 | 0.20 | 0.00 | 9.00 | 20.00 | 29.00 | |
| | M14 | 0 | 0 | 15 | 15 | 0.00 | 0.00 | 1.00 | 0.00 | 0.00 | 100.00 | 100.00 | |
| | M15 | 0 | 0 | 15 | 15 | 0.00 | 0.00 | 1.00 | 0.00 | 0.00 | 100.00 | 100.00 | |

| | | Count | | 0 | 15 | 15 | 0.00 | 0.00 | 1.00 | 0.00 | 100.00 | 100.00 | 11.00 | C3 Experience Index |
| --- | --- | --- | --- | --- | --- | --- | --- | --- | --- | --- | --- | --- | --- | --- |
| | | Sum | | | | | | | | | | | 850.00 | 99 |
| | | Averaged Sum | | | | | | | | | | | 77.30 | C3 Grade |
| | | Scaled Sum | | | | | | | | | | | 77.30 | A |
| C3 | | M16 | 0 | 1 | 90 | 91 | 0.01 | 0.00 | 0.99 | 0.00 | 98.90 | 98.90 | | Main Contributor |
| | | M17 | | | | | | | | | | | | - |
| | | M18 | 0 | 1 | 90 | 91 | 0.01 | 0.00 | 0.99 | 0.00 | 98.90 | 98.90 | | |
| | 506 | Count | | | | | | | | | | | 3.00 | |
| | | Sum | | | | | | | | | | | 297.80 | |
| | | Averaged Sum | | | | | | | | | | | 99.27 | |
| | | Scaled Sum | | | | | | | | | | | 99.27 | |
| | | M19 | 4 | 0 | 146 | 150 | 0.03 | 0.00 | 0.97 | 0.00 | 97.33 | 97.33 | | C4 Experience Index |
| | | | | | | | | | | | | | | 90 |
| | | | | | | | | | | | | | | C4 Grade |
| | | | | | | | | | | | | | | A |
| C4 | | M20 | 10 | 30 | 90 | 130 | 0.08 | 0.23 | 0.69 | 6.92 | 69.23 | 76.15 | | Main Contributor |
| | | M21 | 4 | 0 | 146 | 150 | 0.03 | 0.00 | 0.97 | 0.00 | 97.33 | 97.33 | | - |
| | 508 | Count | | | | | | | | | | | 3.00 | |
| | | Sum | | | | | | | | | | | 270.82 | |
| | | Averaged Sum | | | | | | | | | | | 90.27 | |
| | | Scaled Sum | | | | | | | | | | | 90.27 | |
| | | Total Count | | | | | | | | | | | 21.00 | Overall Wi-Fi Experience Index |
| | | Total Sum | | | | | | | | | | | 1678.96 | 80 |
| | | Averaged Total Sum | | | | | | | | | | | 79.95 | Overall Wi-Fi Grade |
| | | Scaled Sum | | | | | | | | | | | 79.95 | C |
| | | | | | | | | | | | | | | Main Contributor |
| | | | | | | | | | | | | | | M13 |
| | | | | | | | | | | | | | | M9 |
| | | | | | | | | | | | | | | M7 |

FIG. 5 (CONTINUED)

HOME NETWORK HEALTH METRICS REPORTING

BACKGROUND

Embodiments of the invention relate to reporting home network health metrics.

SUMMARY

Aspects of the present disclosure are drawn to an electronic device for use with a network device, the electronic device including: a memory, having stored therein, a first set of threshold weighted metric values, a second set of threshold weighted metric values, and a remediation suggestion; and a processor configured to execute instructions stored on the memory to cause the electronic device to: obtain a first set of metric values associated with a first set of metrics, respectively, within a first metric category of the network device; provide a first set of weighting factors for the first set of metric values, respectively; determine a first set of weighted metric values associated with the first set of metric values, respectively, and being based on the first set of metric values and the first set of weighting factors; obtain a second set of metric values associated with a second set of metrics, respectively, within a second metric category of the network device; provide a second set of weighting factors for the second set of metric values, respectively; determine a second set of weighted metric values associated with the second set of metric values, respectively, and being based on the second set of metric values and the second set of weighting factors; provide a first metric category score based on comparison of the first set of threshold weighted metric values and the first set of weighted metric values; provide a second metric category score based on comparison of the second set of threshold weighted metric values and the second set of weighted metric values; and perform a remediation operation associated with the remediation suggestion when the first metric category score is lower than a first metric category score threshold.

In some embodiments, the processor is further configured to execute instructions stored on the memory to additionally cause the electronic device to: obtain, a predetermined number of times, the first set of metric values associated with the first set of metrics, respectively, within the first metric category of the network device.

In some embodiments, the processor is further configured to execute instructions stored on the memory to additionally cause the electronic device to: obtain, a number of times over a predetermined time period, the first set of metric values associated with the first set of metrics, respectively, within the first metric category of the network device.

In some embodiments, the processor is further configured to execute instructions stored on the memory to additionally cause the electronic device to receive a user selection of a proposed remediation operation, and the processor is further configured to execute instructions stored on said memory to additionally cause said electronic device to perform the remediation operation based on the user selection.

Other aspects of the present disclosure are drawn to a method of using an electronic device with a network device, including: obtaining, via a processor configured to execute instructions stored on a memory additionally having a first set of threshold weighted metric values, a second set of threshold weighted metric values and a remediation suggestion stored therein, a first set of metric values associated with a first set of metrics, respectively, within a first metric category of the network device; providing, via the processor, a first set of weighting factors for the first set of metric values, respectively; determining, via the processor, a first set of weighted metric values associated with the first set of metric values, respectively, and being based on the first set of metric values and the first set of weighting factors; obtaining, via the processor, a second set of metric values associated with a second set of metrics, respectively, within a second metric category of the network device; providing, via the processor, a second set of weighting factors for the second set of metric values, respectively; determining, via the processor, a second set of weighted metric values associated with the second set of metric values, respectively, and being based on the second set of metric values and the second set of weighting factors; providing, via the processor, a first metric category score based on comparison of the first set of threshold weighted metric values and the first set of weighted metric values; providing, via the processor, a second metric category score based on comparison of the second set of threshold weighted metric values and the second set of weighted metric values; and generating, via the processor, a remediation signal associated with the remediation suggestion when the first metric category score is lower than a first metric category score threshold.

In some embodiments, the first set of metric values associated with the first set of metrics, respectively, within the first metric category of the network device includes obtaining, a predetermined number of times, the first set of metric values associated with the first set of metrics, respectively, within the first metric category of the network device.

In some embodiments, the first set of metric values associated with the first set of metrics, respectively, within the first metric category of the network device includes obtaining a number of times over a predetermined time period, the first set of metric values associated with the first set of metrics, respectively, within the first metric category of the network device.

In some embodiments, the method further includes: receiving, via the processor, a user selection of a proposed remediation operation, wherein the performing, via the processor, the remediation operation includes performing the remediation based on the user selection.

Other aspects of the present disclosure are drawn to a non-transitory, computer-readable media having computer-readable instructions stored thereon, the computer-readable instructions being capable of being read by an electronic device for use with a network device, wherein the computer-readable instructions are capable of instructing the electronic device to perform the method including: obtaining, via a processor configured to execute instructions stored on a memory additionally having a first set of threshold weighted metric values, a second set of threshold weighted metric values and a remediation suggestion stored therein, a first set of metric values associated with a first set of metrics, respectively, within a first metric category of the network device; providing, via the processor, a first set of weighting factors for the first set of metric values, respectively; determining, via the processor, a first set of weighted metric values associated with the first set of metric values, respectively, and being based on the first set of metric values and the first set of weighting factors; obtaining, via the processor, a second set of metric values associated with a second set of metrics, respectively, within a second metric category of the network device; providing, via the processor, a second set of weighting factors for the second set of metric values, respectively; determining, via the processor, a second set of weighted metric values associated with the second set of metric values, respectively, and being based on the second set of metric values and the second set of weighting factors; providing, via the processor, a first metric category score based on comparison of the first set of threshold weighted metric values and the first set of weighted metric values; providing, via the processor, a second metric category score based on comparison of the second set of threshold weighted metric values and the second set of weighted metric values; and generating, via the processor, a remediation signal associated with the remediation suggestion when the first metric category score is lower than a first metric category score threshold.

In some embodiments, the computer-readable instructions are capable of instructing the electronic device to perform the method wherein the obtaining the first set of metric values associated with the first set of metrics, respectively, within the first metric category of the network device further includes obtaining, a predetermined number of times, the first set of metric values associated with the first set of metrics, respectively, within the first metric category of the network device.

In some embodiments, the computer-readable instructions are capable of instructing the electronic device to perform the method wherein the obtaining the first set of metric values associated with the first set of metrics, respectively, within the first metric category of the network device further includes obtaining a number of times over a predetermined time period, the first set of metric values associated with the first set of metrics, respectively, within the first metric category of the network device.

In some embodiments, the computer-readable instructions are capable of instructing the electronic device to perform the method further including: receiving, via the processor, a user selection of a proposed remediation operation, wherein the performing, via the processor, the remediation operation comprises performing the remediation based on the user selection.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Residential home networks typically include a gateway device which provides Wide Area Network (WAN) access to an operator's network on one side and Local Area Network (LAN) access to the customer's home network on the other side.

Wi-Fi access can provide the most flexibility for LAN access but it also introduces a set of new challenges, particularly as home networks evolve to include wireless extenders for "mesh service" to extend Wi-Fi reach within a home.

Key to an operator's success is being able to determine the health of their customers' home networks. Ideally an operator can continually monitor the health of each of their customers' home networks through the gateway device they provide their customers and, when problems exist, identify the problems with actionable recommendations/remediations to correct the issue. This information may even be shared via operator supplied web site access to customers who want information on their home network health. Even so, it may prove difficult for the operator to determine exactly what is wrong with customers' home network health.

What is needed is a system and method for reporting and repairing home network health metrics.

A system and method in accordance with the present disclosure reports and repairs home network health metrics.

In accordance with the present disclosure, home network health metrics are found by rolling up a set of home network metrics spanning network health metrics categories. A network metric may be any parameter of or relating to a network that is able to be measured, non-limiting examples of which include an access point device transmitter PHY rate, an access point device receiver RSSI, a steering fail indication, etc. Each metric category is given a quality score and grade based on its performance. To find these metric category scores, each metric making up a single metric category has its data rolled up during a rollup period. Each metric has predetermined thresholds, for poor (red), fair (yellow), and good (green) characteristics. The outcome of each metric's values during a rollup period is binned. These binned values are then used to calculate each metric's overall score. These metric scores are used to find the overall health of their respective network metric category. Similarly, these network metric category scores are used to find the overall health of the entire home network. If there is a specific metric or metric category that is bringing down the overall health of the home network, a remediation operation is performed to help the home network perform better.

An example system and method for reporting home network health metrics in accordance with aspects of the present disclosure will now be described in greater detail with reference to FIGS. 1-5.

Figure 1:
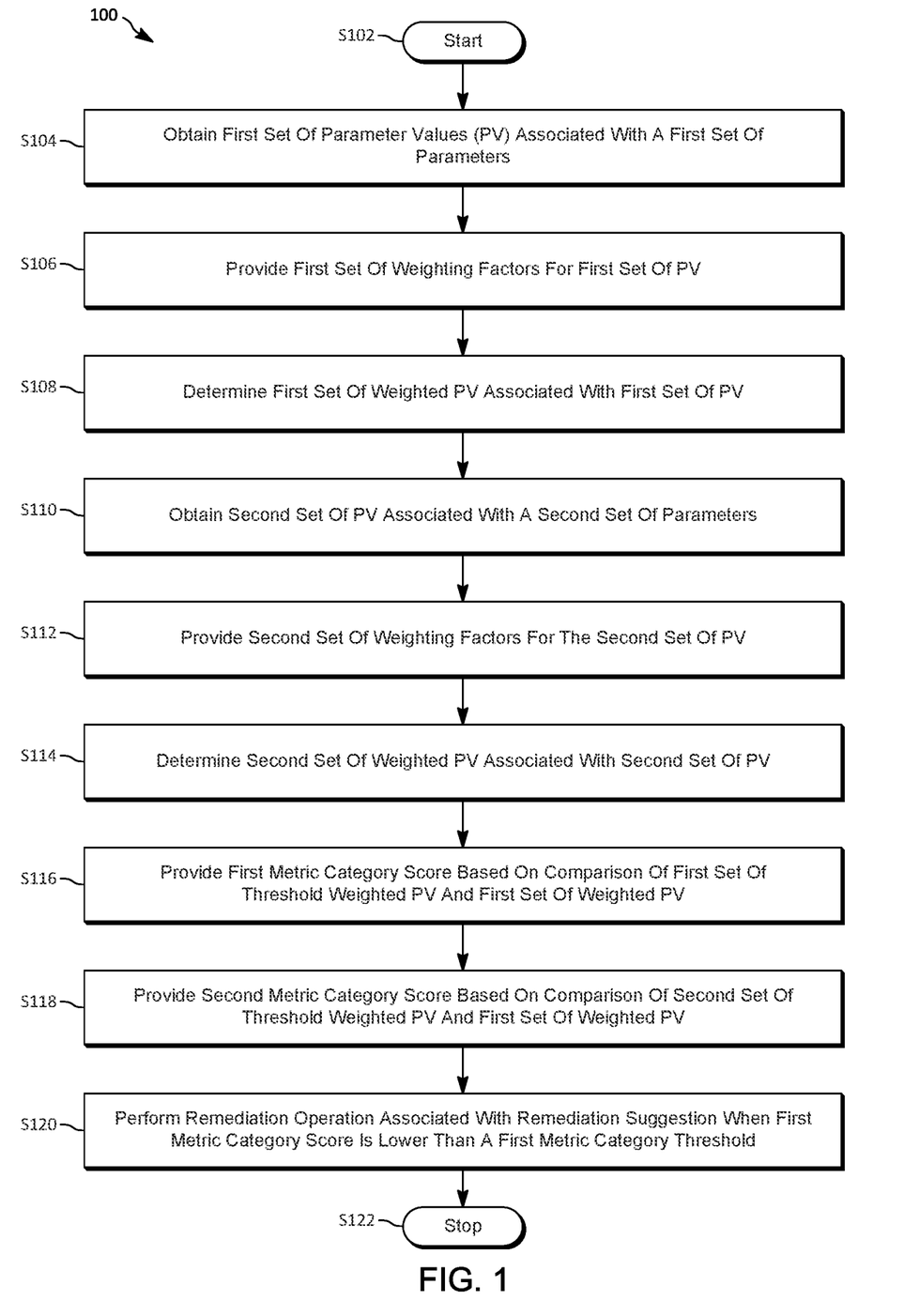
FIG. 1 illustrates an algorithm for finding and resolving unhealthy network metrics.

FIG. 1 illustrates an algorithm 100 to be executed by a processor for finding and resolving unhealthy network metrics.

As shown in the figure, method 100 starts (S102), and the first set of metric values associated with a first set of metrics is obtained (S104). This will be described in greater detail with reference to FIGS. 2-4.

Figure 2:
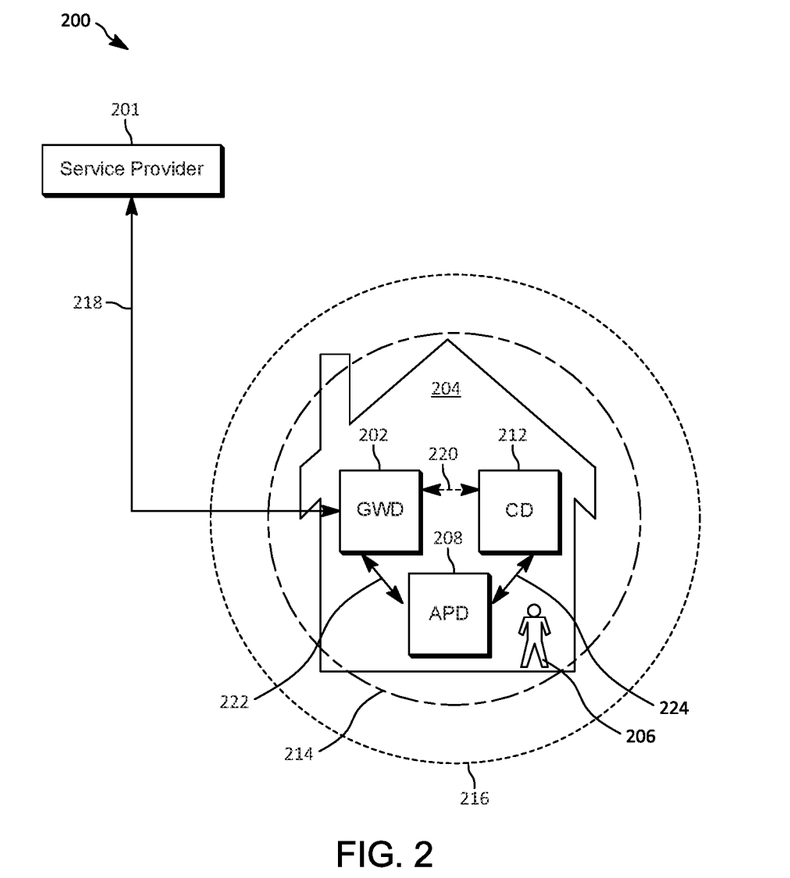
FIG. 2 illustrates a wireless network.

FIG. 2 illustrates a wireless network 200. As shown in the figure, wireless network 200 includes a service provider 201, a gateway device 202, a residence 204, a resident 206, an access point device 208, a client device 212, areas 214 and 216, physical media/wiring 218, and wireless communication channels 220, 222, and 224.

Area 214 and 216 represent a respective area in which a respective Wi-Fi band is broadcasting. Area 214 represents the 5 GHz band, and area 216 represents the 2.4 GHz band.

Figure 3:
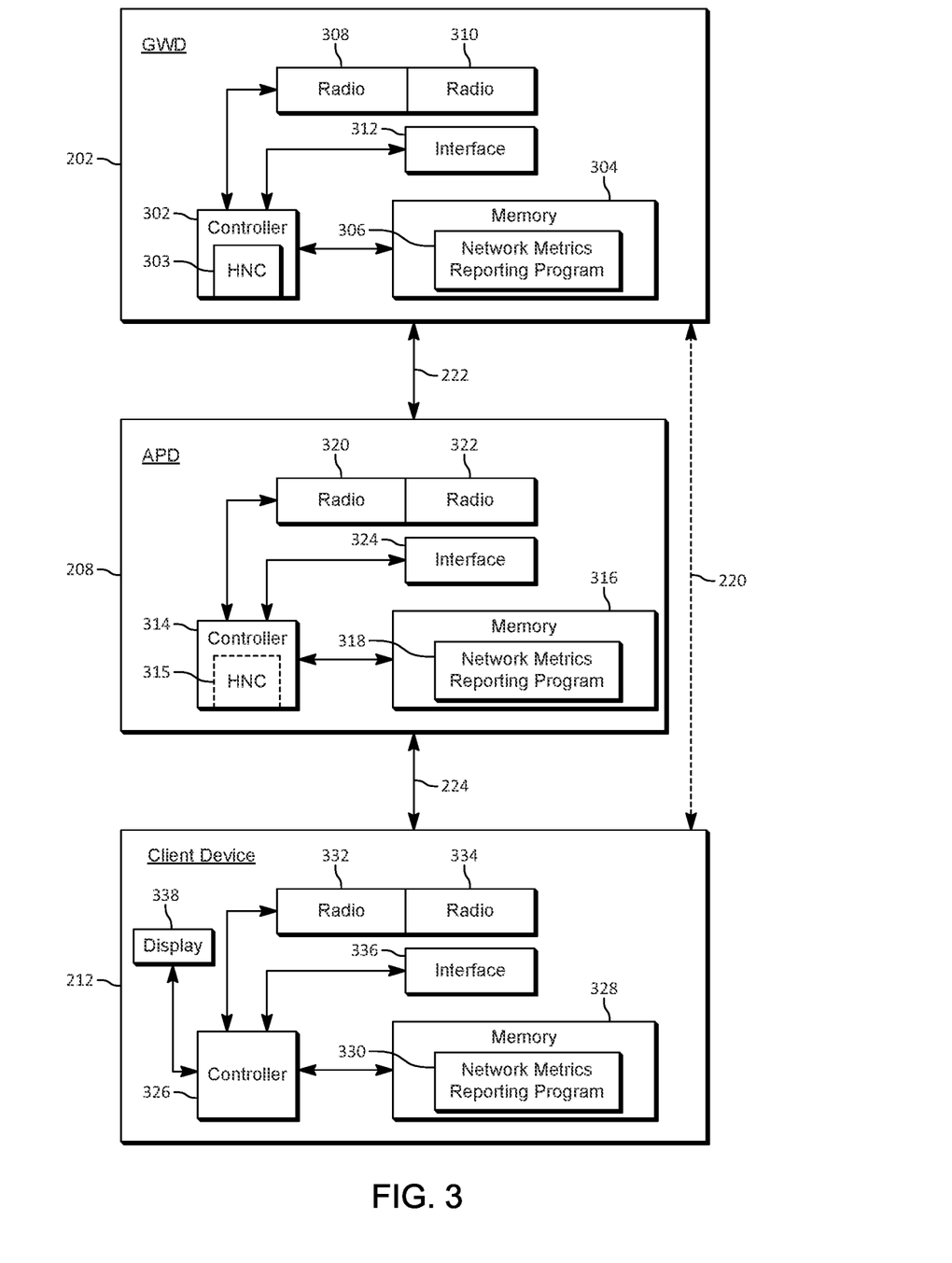
FIG. 3 illustrates an exploded view of a gateway device, an access point device, and a client device.

FIG. 3 illustrates an exploded view of gateway device 202, access point device 208, and client device 212. As shown in the figure, gateway device 202 includes controller 302, having a home network controller (HNC) 303 therein, memory 304, which has stored therein network metrics reporting program 306, radios 308 and 310, and interface circuit 312.

Gateway device 202, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 202 may be any device or system that is operable to allow data to flow from one discrete network to another. Gateway device 202 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

In this example, controller 302, memory 304, radio 308, and radio 310 are illustrated as individual devices. However, in some embodiments, at least two of controller 302, memory 304, radio 308, and radio 310 may be combined as a unitary device. Whether as individual devices or as combined devices, controller 302, memory 304, radio 308, and radio 310 may be implemented as any combination of an apparatus, a system and an integrated circuit. Further, in some embodiments, at least one of controller 302 and memory 304 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 302 may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 202 in accordance with the embodiments described in the present disclosure.

In this example, HNC 303 resides in controller 302 of gateway device 202. However, an HNC may reside in any access point device (APD) within the wireless network, for example as represented by optional dotted HNC 315 within controller 314 of APD 208. HNC 303 may perform tasks such as steering client devices, such as a cell phone, from one access point to another.

Memory 304 can store various programming, and user content, and data, including network metrics reporting program 306.

Radio 308 and radio 310 may also be referred to as a wireless communication circuit, such as a Wi-Fi WLAN interface radio transceiver and is operable to communicate with client device 212. Radio 308 and radio 310 include one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Gateway device 202 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Interface circuit 312 can include one or more connectors, such as RF connectors, or Ethernet connectors, and/or wireless communication circuitry, such as 5G circuitry and one or more antennas.

Returning to FIG. 3, access point device 208 includes a controller 314, which in optional embodiments include a HNC 315, a memory 316, which has stored therein network metrics reporting program 318, radios 320 and 322, and interface circuit 324.

In this example, controller 314, memory 316, radio 320, radio 322, and interface circuit 324 are illustrated as individual devices. However, in some embodiments, at least two of controller 314, memory 316, radio 320, radio 322, and interface circuit 324 may be combined as a unitary device. Further, in some embodiments, at least one of controller 314 and memory 316 may be implemented as a computer having tangible computer-readable media for carrying or having computer-executable instructions or data structures stored thereon.

Controller 314, may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of APD 208 in accordance with the embodiments described in the present disclosure.

Memory 316 can store various programming, and user content, and data including network metrics reporting program 318.

Radios 320 and 322 may include a Wi-Fi WLAN interface radio transceiver that is operable to communicate with gateway device 202, as shown in FIG. 3. Radios 320 and 322 include one or more antennas and communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. APD 208 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Interface circuit 324 can include one or more connectors, such as RF connectors, or Ethernet connectors, and/or wireless communication circuitry, such as 5G circuitry and one or more antennas.

Returning to FIG. 3, client device 212 includes controller 326, memory 328, which has stored therein network metrics reporting program 330, radios 332 and 334, interface circuit 336, and display 338.

In this example, controller 326, memory 328, radio 332, radio 334, and interface circuit 336 are illustrated as individual devices. However, in some embodiments, at least two of controller 326, memory 328, radio 332, radio 334, and interface circuit 336 may be combined as a unitary device. Further, in some embodiments, at least one of controller 326 and memory 328 may be implemented as a computer having tangible computer-readable media for carrying or having computer-executable instructions or data structures stored thereon.

Controller 326, may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 212 in accordance with the embodiments described in the present disclosure.

Memory 328 can store various programming, and user content, and data including network metrics reporting program 330. In some embodiments, as will be described in greater detail below, network metrics reporting program 330 includes instructions that when executed by controller 326 enable client device 212 to: obtain a first set of metric values associated with a first set of metrics, respectively, within a first metric category of gateway device 202; provide a first set of weighting factors for the first set of metric values, respectively; determine a first set of weighted metric values associated with the first set of metric values, respectively, and being based on the first set of metric values and the first set of weighting factors; obtain a second set of metric values associated with a second set of metrics, respectively, within a second metric category of gateway device 202; provide a second set of weighting factors for the second set of metric values, respectively; determine a second set of weighted metric values associated with the second set of metric values, respectively, and being based on the second set of metric values and the second set of weighting factors; provide a first metric category score based on comparison of the first set of threshold weighted metric values and the first set of weighted metric values; provide a second metric category score based on comparison of the second set of threshold weighted metric values and the second set of weighted metric values; and perform a remediation operation associated with the remediation suggestion when the first metric category score is lower than a first metric category score threshold.

In some embodiments, network metrics reporting program 330 includes further instructions that when executed by controller 326 enable client device 212 to obtain, a predetermined number of times, the first set of metric values associated with the first set of metrics, respectively, within the first metric category of the gateway device 202.

In some embodiments, network metrics reporting program 330 includes further instructions that when executed by controller 326 enable client device 212 to obtain, a number of times over a predetermined time period, the first set of metric values associated with the first set of metrics, respectively, within the first metric category of gateway device 202.

In some embodiments, network metrics reporting program 330 includes further instructions that when executed by controller 326 enable client device 212 to receive a user selection of a proposed remediation operation, and the processor is further configured to execute instructions stored on said memory to additionally cause client device 212 to perform the remediation operation based on the user selection.

Radios 332 and 334 may include a Wi-Fi WLAN interface radio transceiver that is operable to communicate with gateway device APD 208, as shown in FIG. 3. Radios 332 and 334 include one or more antennas and communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 212 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Interface circuit 336 can include one or more connectors, such as RF connectors, or Ethernet connectors, and/or wireless communication circuitry, such as 5G circuitry and one or more antennas.

Display 338 may be any known device or system to display an image to the user. In some embodiments, display 338 includes a graphic user interface (GUI) that enables user interaction with client device 212. This will be described in greater detail with reference to FIG. 4.

Figure 4:
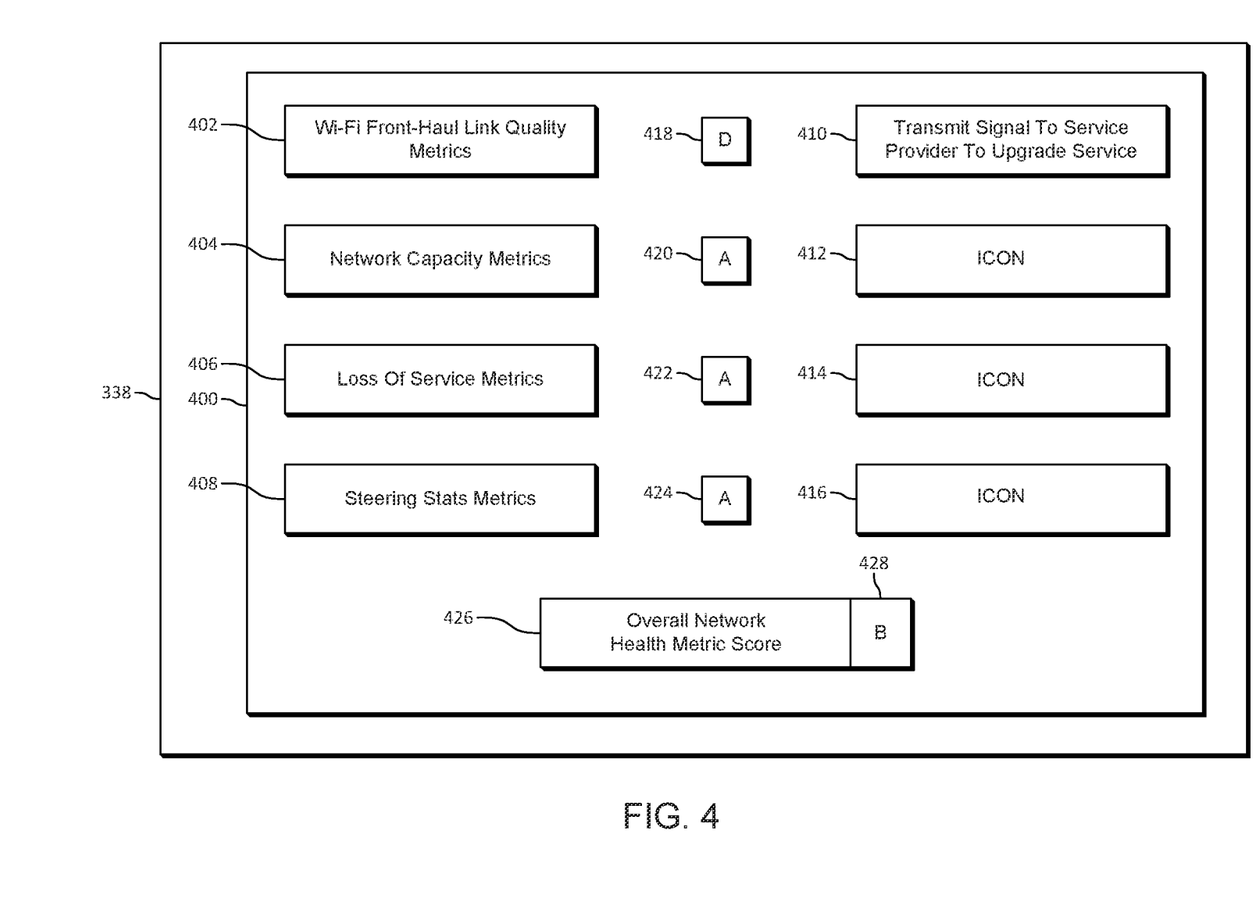
FIG. 4 illustrates a graphic design interface (GUI)

FIG. 4 illustrates a GUI 400.

As shown in the figure, GUI 400 may include a plurality of icons, a sample of which are illustrated as icons 402, 404, 406, 408, 410, 412, 414, 416, 418, 420, 422, 424, 426 and 428, all of which are shown on display 338.

In this non-limiting example, icon 402 indicates Wi-Fi front-haul link quality metrics, whereas icon 418 provides an actual score for those metrics as a "D." Icon 404 indicates Wi-Fi network capacity metrics, whereas icon 420 provides an actual score for those metrics as an "A." Icon 406 indicates loss of service metrics, whereas icon 422 provides an actual score for those metrics as an "A." Icon 408 indicates steering stats metrics, whereas icon 424 provides an actual score for those metrics as an "A." In this manner, a user may easily see what metrics are faring poorly in the network and what metrics are faring well.

Further, icons 410, 412, 414 and 416 are provided for remediation suggestions, for any network metrics that are not performing well. In this non-limiting example, icon 410 provides a remediation suggestion for the poor Wi-Fi front-haul link quality metrics, which received a "D" score. In this example, the remediation suggestion to improve the Wi-Fi front-haul link quality metrics is provided as "transmit signal to service provider to upgrade service." In this manner, a user may not only easily see what metrics are faring poorly, but they may quickly be provided with a remediation suggestion to rectify the underperforming metrics to improve the overall network health.

Finally, the overall network health metric score is shown in icon 426, wherein the actual value of the score is shown in icon 428 as a "B." In this manner, a user can quickly and easily see that the network is, overall in this example, performing well.

Returning to FIG. 1, assume that resident 206 of residence 204 is using GUI 400 on client device 212. Using GUI 400, resident 206 desires to check the overall health of the networks within residence 204. Further, for purposes of discussion, suppose that resident 206 is not particularly sophisticated with respect to home networks. In accordance with aspects of the present disclosure, resident 206 may easily determine whether the networks within residence 204 need improvement. Further, in accordance with aspects of the present disclosure, resident 206 may be informed of remediation suggestions to address any needed improvements. Still further, in accordance with aspects of the present disclosure, aspects of networks within residence 204 may automatically adjust to address any needed improvements.

Returning to FIG. 1, after the first set of metric values associated with a first set of metrics is obtained (S104), the first set of weighting factors for the first set of metric values is provided (S106). This will be described in greater detail with reference to FIG. 5.

Figure 5:
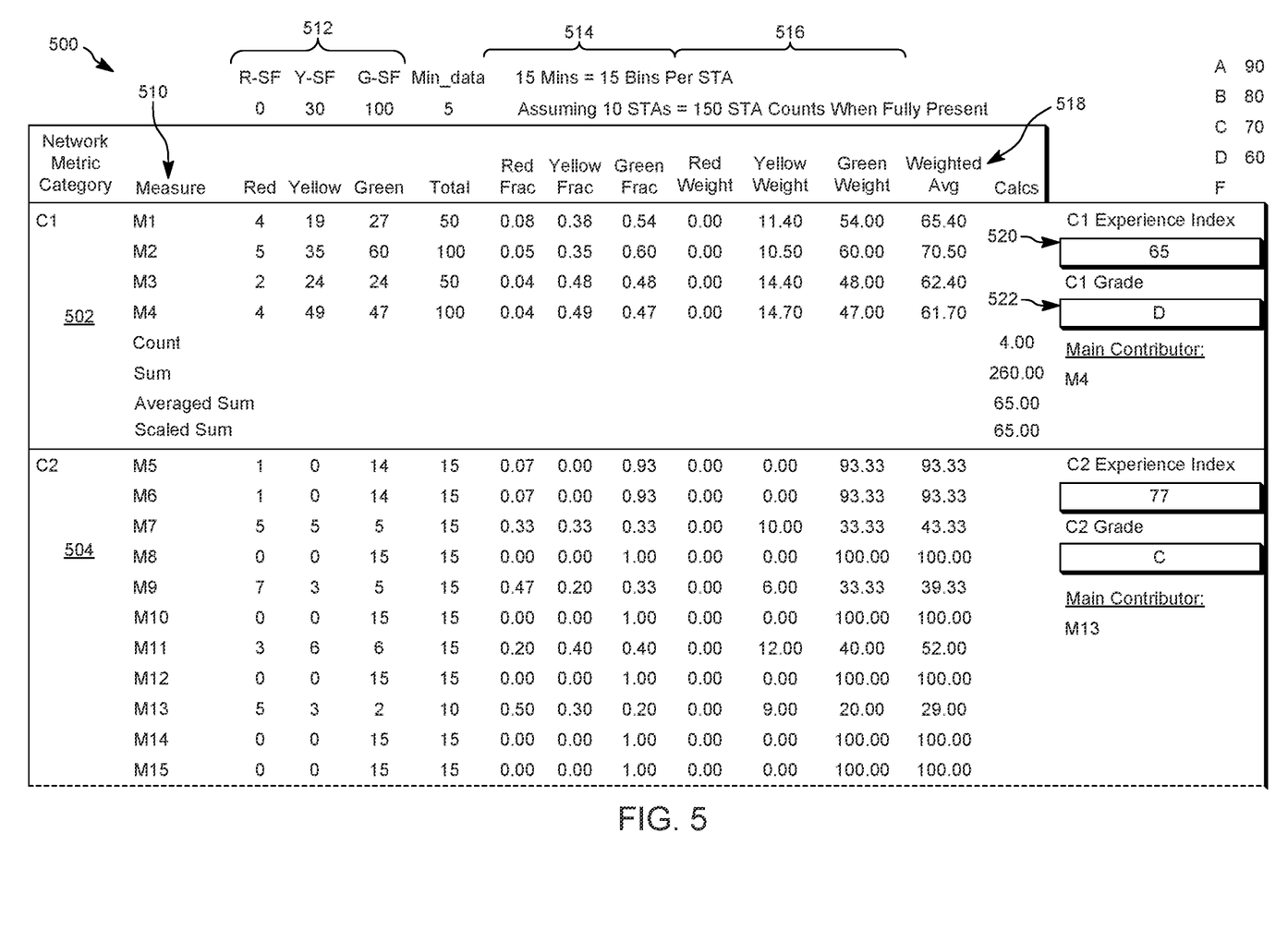
FIG. 5 illustrates a network health metric chart.

FIG. 5 illustrates a network health metric chart 500, in accordance with aspects of the present disclosure.

As shown in the figure, chart 500 includes: rows of metric categories 502, 504, 506, and 508; a column of metrics 510; columns of binned-data 512; columns of fractioned binned-data 514; columns of weighted factors 516; a column of a weighted average 518; a numerical health index for each metric category, a sample of which is indicated as numerical health index 520; and a grade health index for each metric category, a sample of which is indicated as grade health index 522.

Controller 326 executes instructions in network metrics reporting program 330 to obtain many values over a rollup period, a non-limiting example of which may be 15 minutes. These values are collected and stored as binned-data as shown in columns of binned-data 512. A red binned-data value indicates a poor value, a yellow binned-data value indicates a mediocre value, and a green binned-data value indicates a great value. As shown in FIG. 3, these data values may be originally obtained by HNC 303 of gateway device 202 by any known manner. In accordance with aspects of the present invention, the values are binned by HNC 303 and may be provided to client device 212. In some embodiments, the binned values are pushed to client device 212, whereas in other embodiments the binned values may be pulled from gateway device 202.

As seen in FIG. 5, controller 326 of client device 212 executed instructions in network metrics reporting program 330 to obtain the binned values from gateway device 202. For example, as shown in metric category 502, the M1 metric includes 4 red, 19 yellow, and 27 green binned-data values of the total of 50 detected values within the non-limiting example 15 minute rollup period. After these values are obtained, they are converted into fractioned binned-data as shown in columns of fractioned binned-data 514.

In some embodiments, some rollup periods may have no data bin assignments when no data is present for a particular metric, such as for a temporarily disassociated client device. Also, some rollup periods may have low traffic bin assignments, when traffic levels are below a configurable threshold, such as when there is no service utilization.

The purpose of finding this data is to accurately find the health of the homeowner's network. If resident 206 has poor internet connection, they can find the problem using chart 500, which constantly updates its data to show what is working properly and what is not.

Returning to FIG. 1, after the first set of weighting factors for the first set of metric values is provided (S106), the first set of weighted metric values associated with the first set of metric values is determined (S108). For example, once the binned-data values for the M1 metric within metric category 502 are found, they are multiplied by the corresponding scaled factors. In a non-limiting example embodiment, the red scale factor is 0, yellow is 30, and green is 100. For instance, multiplying any number by the red scale factor would result in a weighted factor of 0. The scaled factors must be configurable and can be adjusted to given greater or lesser weighting to red, yellow, and green binned fractions depending on what is deemed appropriate for the network as noted above. This example embodiment has determined the weighted factors for the M1 metric within metric category 502 as shown in columns of weighted factors 516. These weighted factors are scaled fractioned binned-data.

Returning to FIG. 1, after the first set of weighted metric values associated with the first set of metric values is determined (S108), the second set of weighting factors for the second set of metric values is obtained (S110). For example, as shown in FIG. 5, metric values for metric category 504, may additionally be obtained from gateway device 202.

Returning to FIG. 1, after the second set of weighting factors for the second set of metric values is obtained (S110), the second set of weighting factors for the second set of metric values is provided (S112). For example, similar to the process for finding weighting factors for metric category 502, controller 326 executed instructions in network metrics reporting program 330 to obtain the binned values from gateway device 202. For example, as shown in metric category 504 the M5 metric includes 1 red, 0 yellow, and 14 green binned-data values of the total of 15 detected values within the 15 minute rollup period. After these M5 metric values are obtained, they are converted into fractioned binned-data as shown in columns of fractioned binned-data 514.

Returning to FIG. 1, after the second set of weighting factors for the second set of metric values is provided (S112), the second set of weighted metric values associated with the second set of metric values is determined (S114). For example, similar to the process for determining the weighted metric values for the M1 metric of metric category 502, once the binned-data values for the M5 metric of metric category 504 are found, they are multiplied by the corresponding scaled factors. This product finds the weighted factors for the M5 metric of metric category 504 as shown in columns of weighted factors 516.

Returning to FIG. 1, after the second set of weighted metric values associated with the second set of metric values is determined (S114), the first metric category score based on the comparison of the first set of threshold weighted metric values and first set of weighted metric values is provided (S116). For example, after the weighted factors 516 for the M1 metric of metric category 502 are found, they are summed together to find the weighted average 518, which in this example is 65.40. Weighted average 518 is then compared to some predetermined value for category 502 quality metrics. Assume for the sake of argument that this predetermined value is 90. 65.40 is not particularly close to 90, therefore metric category 502 is given a poor numerical health index 520 and a poor grade health index 522.

However, in some embodiments, resident 206 may check all metrics of metric category 502 as shown in column of metrics 510, which in this example includes metrics M1-M4. As shown in FIG. 5, when the process described above is repeated to include all metrics 510, metric category 502 is given a numerical health index 520 of 65, as well as a grade health index 522 of D.

Returning to FIG. 1, after the first metric category score based on the comparison of the first set of threshold weighted metric values and first set of weighted metric values is provided (S116), the second metric category score based on the comparison of the second set of threshold weighted metric values and second set of weighted metric values is provided (S118). For example, similar to the process done for metric category 502, the weighted factors 516 for the M5 metric of metric category 504 are found, they are summed together to find the weighted average as shown in weighted average column 518, which in this case is 93.33. The value of the weighted average as shown in weighted average column 518 is then compared to some predetermined value for metric category 504 metrics. Assume for the sake of argument that this predetermined value is 90. 93.33 is greater than 90, therefore metric category 504 would be given a 93.33 health index and a grade health index as an "A".

However, in some embodiments, similar to metric category 502, resident 206 may check all metrics of metric category 504 as shown in column of metrics 510, which in this example includes metrics M5-M15. As shown in FIG. 5, when checking all the metrics, metric category 504 is given a numerical health index 77, and a grade health index of a "C".

Resident 206 is looking to find an overall network health metric to determine how well their wireless network is performing. This process simplifies the performance of the wireless network into a value out of 100, and into a grade so that resident 206 is able to easily understand the health of wireless network, even in instances where resident 206 is not particularly sophisticated in wireless networking.

Returning to FIG. 1, after the second metric category score based on the comparison of the second set of threshold weighted metric values and second set of weighted metric values is provided (S118), a remediation operation associated with remediation suggestion when the first metric category score is lower than a first metric category threshold is performed (S120). For example, when metric category 502 is given its health index scores, it will be determined if these scores meet the metric category threshold. Assume metric category 502 received a numerical health index of 65 and a grade health index of "D", and that these scores do not meet the metric category threshold. Because metric category 502 did not meet the metric category threshold, a remediation operation will be performed. Assume to strengthen the network health of metric category 502, the remediation suggestion is upgrading service. A non-limiting example of a remediation operation is transmitting a signal to service provider 201 to upgrade the service of residence 204. This not only shows resident 206 what is wrong with wireless network 200, but it also will remedy the problem for resident 206.

Returning to FIG. 1, after a remediation operation associated with remediation suggestion when the first metric category score is lower than a first metric category threshold (S120), algorithm 100 ends (S122).

Currently, when a homeowner has a problem with the wireless network, it may be hard to determine what is causing the problem. The homeowner can ask for help from the service providers, but even they may find it difficult to pinpoint what exactly is wrong with the wireless network. Tests can be run, and the service provider can give some tips or ideas to the homeowner for them to fix the problem. Alternatively, the service provider may send a technician to the residence to determine and hopefully remedy the problem. These conventional methods can be inconsistent, and may lead to the problem to not be fixed at all.

In some embodiments of the present disclosure, a monitoring process may be a rolling average. For example, if algorithm 100 were to monitor network metrics on a rolling average, rather than a total average from the beginning of a predetermined time period, the oldest data would constantly be removed, while the newest data would constantly be brought in to replace the old data—a first in, first out or FIFO data average. This will provide a more precise network health metric report in real time.

In some embodiments, service provider 201 may request data from gateway device 202, and data may be sent to service provider 201 from gateway device 202. This process may be performed using a management information base (MIB) or by way of a TR-069 protocol, which provides support functions for auto-configuration, diagnostics, etc.

In accordance with the present disclosure, home network health metrics are found by rolling up a set of home network metrics spanning network health metrics categories. Each metric category is given a quality score and grade based on its performance. To find these metric category scores, each metric making up a single metric category has its data rolled up during a rollup period. Each metric has predetermined thresholds, for poor (red), fair (yellow), and good (green) characteristics. The outcome of each metric's values during a rollup period is binned. These binned values are then used to calculate each metric's overall score. These metric scores are used to find the overall health of their respective network metric category. Similarly, these network metric category scores are used to find the overall health of the entire home network. For example, as shown in FIG. 4 and as discussed above, the overall network health metric score is a "B." If there is a specific metric or metric category that is bringing down the overall health of the home network, a remediation operation is performed to help the home network perform better.

Thus, the present disclosure as disclosed accurately shows the health of the network to the homeowner. Furthermore, if there is a specific part of the network that is unhealthy, a remediation operation may be performed to help improve the wireless network.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electronic device for use with a network device, said electronic device comprising:
   a memory, having stored therein, a first set of threshold weighted metric values, a second set of threshold weighted metric values, and a remediation suggestion; and
   a processor configured to execute instructions stored on said memory to cause said electronic device to:
   obtain a first set of metric values associated with a first set of metrics, respectively, within a first metric category of the network device;
   provide a first set of weighting factors for the first set of metric values, respectively;
   determine a first set of weighted metric values associated with the first set of metric values, respectively, and being based on the first set of metric values and the first set of weighting factors;
   obtain a second set of metric values associated with a second set of metrics, respectively, within a second metric category of the network device;
   provide a second set of weighting factors for the second set of metric values, respectively;
   determine a second set of weighted metric values associated with the second set of metric values, respectively, and being based on the second set of metric values and the second set of weighting factors;
   provide a first metric category score based on comparison of the first set of threshold weighted metric values and the first set of weighted metric values;
   provide a second metric category score based on comparison of the second set of threshold weighted metric values and the second set of weighted metric values; and
   perform a remediation operation associated with the remediation suggestion when the first metric category score is lower than a first metric category score threshold.

2. The electronic device of claim 1, wherein the processor is further configured to execute instructions stored on said memory to additionally cause said electronic device to:
   obtain, a predetermined number of times, the first set of metric values associated with the first set of metrics, respectively, within the first metric category of the network device.

3. The electronic device of claim 1, wherein the processor is further configured to execute instructions stored on said memory to additionally cause said electronic device to:
   obtain, a number of times over a predetermined time period, the first set of metric values associated with the first set of metrics, respectively, within the first metric category of the network device.

4. The electronic device of claim 1,
   wherein the processor is further configured to execute instructions stored on said memory to additionally cause said electronic device to receive a user selection of a proposed remediation operation, and
   the processor is further configured to execute instructions stored on said memory to additionally cause said electronic device to perform the remediation operation based on the user selection.

5. A method of using an electronic device with a network device, said method comprising:
- obtaining, via a processor configured to execute instructions stored on a memory additionally having a first set of threshold weighted metric values, a second set of threshold weighted metric values and a remediation suggestion stored therein, a first set of metric values associated with a first set of metrics, respectively, within a first metric category of the network device;
- providing, via the processor, a first set of weighting factors for the first set of metric values, respectively;
- determining, via the processor, a first set of weighted metric values associated with the first set of metric values, respectively, and being based on the first set of metric values and the first set of weighting factors;
- obtaining, via the processor, a second set of metric values associated with a second set of metrics, respectively, within a second metric category of the network device;
- providing, via the processor, a second set of weighting factors for the second set of metric values, respectively;
- determining, via the processor, a second set of weighted metric values associated with the second set of metric values, respectively, and being based on the second set of metric values and the second set of weighting factors;
- providing, via the processor, a first metric category score based on comparison of the first set of threshold weighted metric values and the first set of weighted metric values;
- providing, via the processor, a second metric category score based on comparison of the second set of threshold weighted metric values and the second set of weighted metric values; and
- generating, via the processor, a remediation signal associated with the remediation suggestion when the first metric category score is lower than a first metric category score threshold.

6. The method of claim 5, wherein said obtaining the first set of metric values associated with the first set of metrics, respectively, within the first metric category of the network device comprises obtaining, a predetermined number of times, the first set of metric values associated with the first set of metrics, respectively, within the first metric category of the network device.

7. The method of claim 5, wherein said obtaining the first set of metric values associated with the first set of metrics, respectively, within the first metric category of the network device comprises obtaining a number of times over a predetermined time period, the first set of metric values associated with the first set of metrics, respectively, within the first metric category of the network device.

8. The method of claim 5, further comprising:
- receiving, via the processor, a user selection of a proposed remediation operation,
- wherein said performing, via the processor, the remediation operation comprises performing the remediation based on the user selection.

9. A non-transitory, computer-readable media having computer-readable instructions stored thereon, the computer-readable instructions being capable of being read by an electronic device for use with a network device, wherein the computer-readable instructions are capable of instructing the electronic device to perform the method comprising:
- obtaining, via a processor configured to execute instructions stored on a memory additionally having a first set of threshold weighted metric values, a second set of threshold weighted metric values and a remediation suggestion stored therein, a first set of metric values associated with a first set of metrics, respectively, within a first metric category of the network device;
- providing, via the processor, a first set of weighting factors for the first set of metric values, respectively;
- determining, via the processor, a first set of weighted metric values associated with the first set of metric values, respectively, and being based on the first set of metric values and the first set of weighting factors;
- obtaining, via the processor, a second set of metric values associated with a second set of metrics, respectively, within a second metric category of the network device;
- providing, via the processor, a second set of weighting factors for the second set of metric values, respectively;
- determining, via the processor, a second set of weighted metric values associated with the second set of metric values, respectively, and being based on the second set of metric values and the second set of weighting factors;
- providing, via the processor, a first metric category score based on comparison of the first set of threshold weighted metric values and the first set of weighted metric values;
- providing, via the processor, a second metric category score based on comparison of the second set of threshold weighted metric values and the second set of weighted metric values; and
- generating, via the processor, a remediation signal associated with the remediation suggestion when the first metric category score is lower than a first metric category score threshold.

10. The non-transitory, computer-readable media of claim 9, wherein the computer-readable instructions are capable of instructing the electronic device to perform the method wherein said obtaining the first set of metric values associated with the first set of metrics, respectively, within the first metric category of the network device comprises obtaining, a predetermined number of times, the first set of metric values associated with the first set of metrics, respectively, within the first metric category of the network device.

11. The non-transitory, computer-readable media of claim 9, wherein the computer-readable instructions are capable of instructing the electronic device to perform the method wherein said obtaining the first set of metric values associated with the first set of metrics, respectively, within the first metric category of the network device comprises obtaining a number of times over a predetermined time period, the first set of metric values associated with the first set of metrics, respectively, within the first metric category of the network device.

12. The non-transitory, computer-readable media of claim 9, wherein the computer-readable instructions are capable of instructing the electronic device to perform the method further comprising:
- receiving, via the processor, a user selection of a proposed remediation operation,
- wherein said performing, via the processor, the remediation operation comprises performing the remediation based on the user selection.

* * * * *